United States Patent
Iaquaniello et al.

(10) Patent No.: US 9,638,064 B2
(45) Date of Patent: May 2, 2017

(54) BACK-UP BOILER SYSTEM FOR A SOLAR THERMAL POWER PLANT BASED ON MOLTEN SALT TECHNOLOGY, A SOLAR THERMAL POWER PLANT AND A METHOD FOR OPERATING A SOLAR THERMAL POWER PLANT

(71) Applicants: STAMICARBON B.V., Sittard (NL); Enea, Agenzia nazionale per le nuove tecnologie, l'energia e lo sviluppo economico sostenibile, Rome (IT)

(72) Inventors: Gaetano Iaquaniello, Rome (IT); Daniela Capoferri, Rome (IT); Adriano Barsi, Rome (IT); Fabrizio Fabrizi, Rome (IT); Walter Gaggioli, Rome (IT); Alberto Giaconia, Rome (IT); Luca Rinaldi, Rome (IT)

(73) Assignees: Stamicarbon B.V., Sittard (NL); Enea, Agenzia Nazionale Per Le Nuove Tecnologie, L'energia E Lo Sviluppo Economico Sostenibile, Rome (IT)

( * ) Notice: Subject to any disclaimer, the term of this patent is extended or adjusted under 35 U.S.C. 154(b) by 186 days.

(21) Appl. No.: 14/385,993

(22) PCT Filed: Mar. 19, 2013

(86) PCT No.: PCT/NL2013/050203
§ 371 (c)(1),
(2) Date: Sep. 17, 2014

(87) PCT Pub. No.: WO2013/141704
PCT Pub. Date: Sep. 26, 2013

(65) Prior Publication Data
US 2015/0089944 A1  Apr. 2, 2015

(30) Foreign Application Priority Data
Mar. 19, 2012 (EP) .................................... 12160187

(51) Int. Cl.
*F01K 3/24* (2006.01)
*F03G 6/06* (2006.01)
(Continued)

(52) U.S. Cl.
CPC .................. *F01K 3/24* (2013.01); *F01K 3/20* (2013.01); *F01K 3/205* (2013.01); *F01K 3/22* (2013.01);
(Continued)

(58) Field of Classification Search
CPC .......... F22B 35/001; F22B 1/006; F22G 5/04; F22G 5/12; F03G 6/003; F03G 6/005;
(Continued)

(56) References Cited

U.S. PATENT DOCUMENTS 3,097,631 A * 7/1963 Martin ...................... F22G 5/04
                                                        122/235.33
3,575,002 A * 4/1971 Vuia ........................ F01K 3/181
                                                        122/1 R
(Continued)

FOREIGN PATENT DOCUMENTS

| DE | 202008002599 | 4/2008 |
|---|---|---|
| EP | 1331366 | 7/2003 |
| WO | WO-2010/149614 | 12/2010 |

OTHER PUBLICATIONS

International Search Report for PCT/NL2013/050203, mailed Mar. 24, 2013, 4 pages.

Primary Examiner — Thai Ba Trieu
Assistant Examiner — Xiaoting Hu
(74) Attorney, Agent, or Firm — Morrison & Foerster LLP

(57) ABSTRACT

A back-up boiler system for a solar thermal power plant (201) for transferring solar energy into electricity, said back-up boiler system comprising a combustion chamber
(Continued)

(70) and a convection section (80) in fluid connection with said combustion chamber (70), wherein in the convection section (80) at least a first heat exchanger (92) is provided for heating a molten salts mixture of the solar thermal power plant and a second heat exchanger (90) for pre-heating boiler feed water of the solar thermal power plant, wherein the back-up boiler system (25) is configured to allow selection between only providing heat to the first heat exchanger (92), only providing heat to the second heat exchanger (90) and providing heat to both heat exchangers (90, 92), preferably dependent on availability of solar radiation and/or dependent on demand of power generation. The invention also relates to a solar thermal power plant (201) for transferring solar energy into electricity and a method for operating a solar thermal power plant.

21 Claims, 5 Drawing Sheets

(51) Int. Cl.
| | | |
|---|---|---|
| *F03G 6/00* | (2006.01) | |
| *F22G 5/04* | (2006.01) | |
| *F22B 35/00* | (2006.01) | |
| *F01K 3/22* | (2006.01) | |
| *F01K 3/20* | (2006.01) | |
| *F22B 1/00* | (2006.01) | |
| *F22B 1/02* | (2006.01) | |
| *F22D 1/00* | (2006.01) | |

(52) U.S. Cl.
CPC ............ *F03G 6/003* (2013.01); *F03G 6/005* (2013.01); *F03G 6/065* (2013.01); *F03G 6/067* (2013.01); *F22B 1/006* (2013.01); *F22B 1/028* (2013.01); *F22B 35/001* (2013.01); *F22D 1/003* (2013.01); *F22G 5/04* (2013.01); *Y02E 10/46* (2013.01)

(58) Field of Classification Search
CPC ......... F03G 6/065; F03G 6/067; Y02E 20/16; F01K 3/20–3/22; F01K 13/00–13/02; F28D 2020/0047
See application file for complete search history.

(56) References Cited

U.S. PATENT DOCUMENTS

| | | | | |
|---|---|---|---|---|
| 4,380,147 | A * | 4/1983 | Zaba | F22B 31/0084 60/39.182 |
| 4,438,630 | A * | 3/1984 | Rowe | F01K 3/18 60/641.8 |
| 4,493,186 | A * | 1/1985 | Emsperger | F22B 1/24 122/1 R |
| 5,247,907 | A * | 9/1993 | Lee | C01B 3/38 122/1 R |
| 5,681,158 | A * | 10/1997 | Knapp | F23L 7/00 431/4 |
| 2008/0127647 | A1 | 6/2008 | Leitner | |
| 2009/0125152 | A1 | 5/2009 | Skowronski et al. | |
| 2009/0320828 | A1 | 12/2009 | Koketsu et al. | |
| 2010/0175365 | A1* | 7/2010 | Ota | F01K 23/10 60/39.181 |
| 2011/0048006 | A1 | 3/2011 | Cap et al. | |
| 2011/0232295 | A1* | 9/2011 | Carroni | F01K 3/24 60/773 |
| 2012/0102950 | A1* | 5/2012 | Turchi | F01K 23/10 60/641.15 |
| 2012/0137683 | A1* | 6/2012 | Jurgen | F01D 19/00 60/641.8 |
| 2013/0098313 | A1* | 4/2013 | Pang | F22G 5/04 122/460 |
| 2013/0147197 | A1* | 6/2013 | Goebel | F01K 3/12 290/52 |
| 2014/0290247 | A1* | 10/2014 | Mishima | B01D 3/065 60/641.9 |
| 2015/0007567 | A1* | 1/2015 | Manzoni | F03G 6/067 60/645 |

* cited by examiner

BACK-UP BOILER SYSTEM FOR A SOLAR THERMAL POWER PLANT BASED ON MOLTEN SALT TECHNOLOGY, A SOLAR THERMAL POWER PLANT AND A METHOD FOR OPERATING A SOLAR THERMAL POWER PLANT

CROSS-REFERENCE TO RELATED APPLICATIONS

This application is the national phase of PCT application PCT/NL2013/050203 having an international filing date of 19 Mar. 2013, which claims benefit of European patent application No. 12160187.6 filed 19 Mar. 2012. The contents of the above patent applications are incorporated by reference herein in their entirety.

FIELD OF THE INVENTION

The present invention relates to the field of solar thermal power plants based on molten salt technology.

BACKGROUND

Amid concerns over global warming and forecasts of depletion of drinkable water and non renewable energy sources, solar energy has become a viable option. By generating solar energy by means of a solar thermal power plant, energy may be produced in an environmental friendly manner, generation of energy is potentially limitless, and energy may be produced in a substantially simple way.

A known type of a solar thermal power plant utilizes a "radiation concentrator collector" which concentrates solar radiation by focusing said radiation into a smaller area, for instance by using mirrored surfaces. In such a known type of solar thermal power plant, a reflector, which is typically parabolic, receives and reflects (focuses) incoming solar radiation onto a radiation absorber, which is formed as a tube. The radiation absorber tube may conventionally be surrounded by a treated glass tube to limit the loss of heat. The space between the radiation absorber tube and the glass tube may be a vacuum space.

The radiation absorber tube may be made of metal with a coating having a high absorption coefficient for solar radiation to maximize the energy transfer from the reflector. A thermal fluid, constituting a heat transfer medium, which is typically a liquid such as oil, flows within the radiation absorber tube.

The thermal energy transported by the thermal fluid is used to generate steam which in turn is expanded into a turbine, in order to generate electricity in a conventional way, by coupling the axle of the turbine to a generator. Then, the steam is condensed and recycled back to a heat exchanger system. The cycle to transfer steam into electricity may be more efficient at high steam temperatures. However, some heat transfer media may dissociate or become less effective in transferring heat if said heat transfer media operate at very high temperatures. Due to this restricting behaviour, conventional plants generating solar thermal energy are typically limited to operate at about 400° C. At such temperature the overall efficiency of the cycle to transfer steam into electricity may be limited to less than 32%.

Of course such a known solar thermal power plant also has an operational limit due to the occasional absence of solar radiation.

In order to extend the operation time of such solar plants, additionally a known thermal storage system based on a molten salts mixture may be used. Such a known system may comprise two thermal storage tanks, a cold fluid storage tank and a hot fluid storage tank. During normal operation, thus when solar radiation to heat the heat transfer medium is present, a fraction of the stream of the heat transfer medium, such as oil, may be used to heat the molten salts mixture that is supplied from the cold storage tank to the hot storage. In case no solar radiation is available, the molten salts mixture flow is reversed. Then, the hot molten salts mixture is used to heat the oil and is supplied from the hot storage tank to the cold storage tank. A drawback of using such system is that a substantial part of the capital investment of conventional solar thermal energy generating plants is absorbed by the molten salt storage system, despite the fact that such a system enables to produce power according to the demand conditions which significantly improves the overall economics.

A further known solar thermal power plant may be based on using molten salts as heat transfer fluid (HTF). Such a solar thermal power plant always needs to operate at a temperature higher than the solidification temperature of the molten salts (around 240° C. for the Na/K nitrates mixture). Auxiliary heaters or boilers may additionally be used. However, the known solar thermal power plants may still have efficiency problems.

Therefore, it is an object of the present invention to provide an improved boiler system for a solar thermal power plant. More in particular an object of the invention is to provide a boiler system for a solar thermal power plant that operates on a molten salts mixture and which allows efficient generating of electricity, preferably under any weather condition and at a low sun level, such as at night.

SUMMARY OF THE INVENTION

According to one aspect of the invention a back-up boiler system for a solar thermal power plant for transferring solar energy into electricity is provided, said back-up boiler system comprising a combustion chamber and a convection section in fluid connection with said combustion chamber, wherein in the convection section at least a first heat exchanger is provided for heating a molten salts mixture of the solar thermal power plant and a second heat exchanger for pre-heating boiler feed water of the solar thermal power plant, wherein the back-up boiler system is configured to allow selection between only providing heat to the first heat exchanger, only providing heat to the second heat exchanger and providing heat to both heat exchangers, preferably dependent on availability of solar radiation and/or dependent on demand of power generation.

Providing such a back-up boiler system according to the invention in a solar thermal power plant enables highly efficient generation of electricity due to the use of a molten salts mixture as heat transfer fluid and as heat storage medium. By using an auxiliary back-up boiler system, the operation time of the solar thermal power plant may be extended to have continuous operation, but also the temperature of the superheated steam and the temperature of the boiler feed water may be controlled more accurately. Dependent on the availability of solar radiation and on the demand for power generation, the back-up boiler system may be used to only provide heat to the heat exchanger for heating the molten salts mixture, to only provide heat to the heat exchanger for pre-heating the boiler feed water or for providing heat to both heat exchangers. Therefore, according to a further aspect of the invention, the back-up boiler system may comprise a selection means that is configured to selectively direct flue gas coming from the combustion chamber along at least one of the first heat exchanger and the second heat exchanger. Also a control means may be provided that is configured to adjust the temperature of the flue gas, for instance the temperature of the flue gas a the moment it leaves the combustion chamber or the temperature of the flue gas at at least one location inside the convection chamber.

For instance, at night, the molten salts mixture needs to be kept above the solidifying temperature of approximately 250° C. to keep it in liquid form. During daytime, when power generation is demanded and solar radiation is available, only pre-heating of the boiler feed water is necessary. In case, no or limited solar radiation is available during daytime, also the molten salts mixture needs to be heated. Due to the selection means and/or the control means, it is possible to selectively transfer heat from the flue gas to at least one of the heat transfer medium, i.e. the molten salts mixture and the boiler feed water.

Preferably, the back-up boiler system may be configured to provide other thermal services dependent on the availability of solar radiation and demand of power generation, which will be discussed further in the present description of the invention.

Selection of a desired operating mode of the back-up boiler system may be provided based on setting of the flue gas supply to the respective heat exchanger and proper temperature control of the flue gas as mentioned before. Therefore, according to a further elaboration of the invention, the back-up boiler system may comprise valve means, preferably provided inside the convention section, configured to provide a bypass allowing flue gas that is supplied from the combustion chamber to bypass the second heat exchanger for pre-heating the boiler feed water. In case there is no power demand for generating electricity, there is no necessity to pre-heat the boiler feed water. By setting the valve means of the back-up boiler system, the flue gas may bypass the heat exchanger for pre-heating the boiler feed water and be directly supplied to the heat exchanger for heating the molten salts mixture.

In order to be able to at least control the temperature of the flue gas for the heating of the molten salts mixture and/or pre-heating the boiler feed water, the temperature of the flue gas may be modified inside the combustion chamber. Therefore, the combustion chamber may comprise, next to a fuel inlet and a primary air inlet for combustion, a temperature control to control the flue gas temperature at least when leaving the combustion chamber. Preferably, the temperature control may comprise a secondary air inlet for supplying air to the combustion chamber to decrease the flue gas temperature, for instance by providing relatively cold air to the combustion chamber. To also be able to control the temperature in the convection section of the back-up boiler section as well, the convection section may also comprise a temperature control to control the flue gas temperature inside the convection section. This further temperature control may be a quench air inlet for providing relatively cold air to the flue gas inside the convention section for cooling down the flue gas.

Preferably, the valve means and both temperature controls are configured to cooperate for heating the molten salts mixture preferably from 280° C.-550° C. and preferably, for heating the boiler feed water preferably up to approximately 250° C.

As mentioned above, the back-up boiler system according to the invention may be configured for additional thermal services. For instance, the back-up boiler system may comprise at least one of heat exchanger for steam generation or steam superheating preferably to a temperature up to 530° C., a heat exchanger for low pressure steam generation and a heat exchanger for pre-heating demineralised water, preferably up to 90° C.

By providing the convection section with at least one of a heat exchanger for steam generation or steam superheating, a heat exchanger for low pressure steam generation and a heat exchanger for pre-heating demineralised water, the convection section of the back-up boiler system may be configured to transfer heat from the flue gas via the different heat exchangers to the respective fluids to provide the above mentioned further thermal services. With such configuration of the back-up boiler system, thus with a desired configuration of coils in the convection section of the boiler system, the solar thermal power plant according to the invention may comply with start-up conditions (i.e. minimizing the start-up time and start-up trouble of the solar powered generation system), daily operating conditions (for instance when the sun is present), night or absence of sun operating conditions (thus providing full back-up conditions to be able to continue generation of electricity) and heating of the molten salts mixture when the sun is absent. Furthermore, in case the solar thermal power plant is provided with a desalination unit, such a back-up boiler system ensures continuous generation of low pressure steam for operation of said desalination unit. Besides, with such a back-up boiler system, the solar thermal power plant will operate with a more stable temperature of the steam at the steam turbine thus overall having a more stable operation and will have a short starting-up period.

If required by specific operating conditions, the back-up boiler system may, according to a further aspect of the invention, comprise a valve means configured to provide a steam bypass allowing the flue gas to bypass the heat exchanger for generating low pressure steam. In a different embodiment of the invention, the back-up boiler system may comprise one of more valve means configured to provide a bypass allowing flue gas from the combustion chamber to bypass at least one of the heat exchangers, for instance a valve means for only bypassing the second heat exchanger for pre-heating the boiler feed water or a valve means for bypassing the heat exchanger for pre-heating the boiler feed water and for bypassing the heat exchanger for steam generation or steam superheating. Or for instance two valve means for bypassing the heat exchanger for pre-heating the boiler feed water and the heat exchanger for heating the molten salts mixture, respectively. Also other configurations may be possible dependent on the specific operating conditions.

To be able to accurately control the temperatures of the different fluids in the solar thermal power plant according to the invention, said system may further comprise a control unit for controlling the back-up boiler system based on at least the molten salts mixture temperature, the boiler feed water temperature and/or the low pressure steam temperature. Therefore, according to a further aspect of the invention, the control unit may be operatively coupled to the primary and/or the secondary air inlets and/or the quench air inlet and to the valve means. Thus, the control unit may, according to a further elaboration of the invention, be configured to control the amount of air entering the combustion chamber via the primary and/or secondary air inlet and/or the amount of air entering the convection section via the quench air inlet in order to control the temperature of the flue gas in the convection section used for heat transfer. The control unit may also be used to control the valve means to obtain the desired heat transfer to at least one of the first and second heat exchangers.

The invention also relates to a solar thermal power plant for transferring solar energy into electricity according to claim 15, comprising a back-up boiler system as above described. Such a solar thermal power plant provides similar advantages as described with the back-up boiler system according to the invention.

In a further embodiment of the solar thermal power plant according to the invention, the power plant may also comprise an integrated thermal desalination unit. With such a configuration of the solar thermal power plant, the low pressure steam coming from the steam turbine may be used to desalinate sea water for drinking purposes. At night, the low pressure steam is generated by the back-up system to allow continuous operation of the desalination unit. Due to the construction of the solar thermal power plant according to the invention, the use of the desalination unit may be relatively efficient as well. It is commonly known that a thermal desalination unit is preferably operated continuously since shutting said unit down and starting the unit up again results in a desalination unit difficult to operate. Since the solar thermal power plant according to the invention is operated with a minimum downtime, the desalination unit may run substantially continuously as well. Consequently, there is no need to use a desalination unit of the reverse osmosis type, thus minimizing the use of electricity for operating said desalination unit, thereby maximizing the capacity of electricity for sale.

Finally, the invention also relates to a method for operating a solar thermal power plant according to the features of claim 18. Such a method provides similar advantages as described with the back-up boiler unit.

The aforementioned and other features and advantages of the invention will be more fully understood from the following detailed description of certain embodiments of the invention, taken together with the accompanying drawings, which are meant to illustrate and not to limit the invention.

BRIEF DESCRIPTION OF THE DRAWINGS

It is noted that identical or corresponding elements in the different drawings are indicated with identical or corresponding reference numerals.

DETAILED DESCRIPTION

Figure 1:
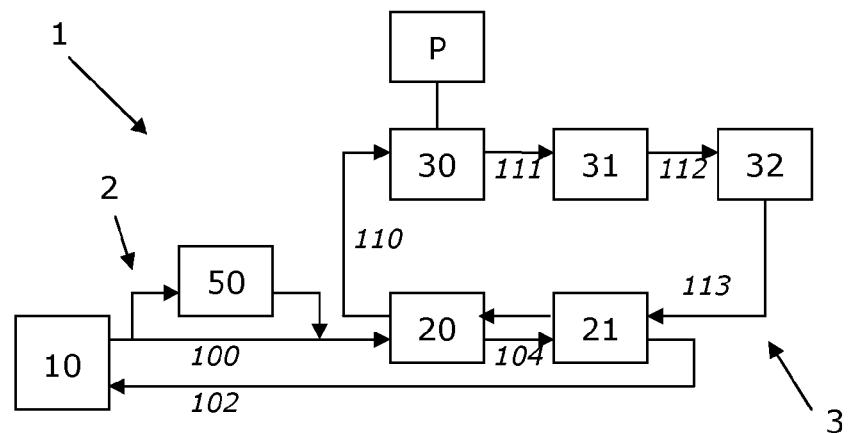
FIG. 1 shows a schematic diagram of a prior art solar thermal plant operating on conventional oil based technology.

In FIG. 1, an example of a prior art solar thermal power plant 1 is shown. The solar thermal power plant 1 comprises a solar collection system 10. The solar collection system 10 comprises one or more radiation absorber tubes and a plurality of through collectors, such as single axis parabolic reflectors. Alternatively, the solar collection system 10 may be provided with any suitable means for concentrating solar radiation, such as Fresnel collectors. The radiation absorber tubes contain a thermal fluid used as heat transfer fluid, such as diathermic oils which are commercially available, for instance commercially available under the trade name Terminal® VP1. In known prior art solar thermal power plants, although less used, the heat transfer fluid may also be one of steam/water, molten salts mixture, carbon dioxide and helium. Flowing inside the radiation absorber tubes, the heat transfer fluid is heated by the exposure to concentrated solar radiation. The heat transfer fluid may be heated to an upper threshold temperature that has to be chosen as the highest safe working temperature for the heat transfer fluid itself, i.e., wherein the thermal fluid remains substantially stable and does not dissociate or have its thermal properties adversely offended by the high temperature. The upper threshold temperature may be around 400° C. for the diathermic oil Terminal® VP-1. The described solar collection system of this type is provided, inter alia, by Siemens Solar Systems.

The heat transfer fluid is circulated, by suitable pumps (not shown) to provide a heat source to produce the steam of the electric power plant.

The hot oil flows (arrow 100) from the solar collection system 10 at a temperature around 400° C. and enters the first heat exchanger 20, where the saturated steam is superheated at 385-388° C. at a pressure that can range from 6.0- to 11.0 MPa. The partially cooled hot oil flows (arrow 104) then into the heat exchanger system 21, which constitutes a steam generation/boiler feed water train and pre-heater train and comprises two or more heat exchangers.

The cold oil at a temperature of 300° C. is recycled back to the solar collection system 10 (arrow 102).

The superheated steam (arrow 110), flows from the first heat exchanger 20 to the steam turbine 30. In the steam turbine 30, power P is extracted from the steam by expanding it serially into at least three turbine stages. Prior to the stage of the last expansion, the steam may be further reheated. The exhaust power steam (arrow 111), is condensed in the steam condenser, 31, and then moved (arrow 112) to the degasifier 32 to eliminate any trace of oxygen or others contaminants; from there the boiler feed water (arrow 113) is recycled back to the heat exchanger system 21.

The unit 50 comprises of one or more heaters to heat the oil during lack-of-sun by burning natural gas.

Figure 2:
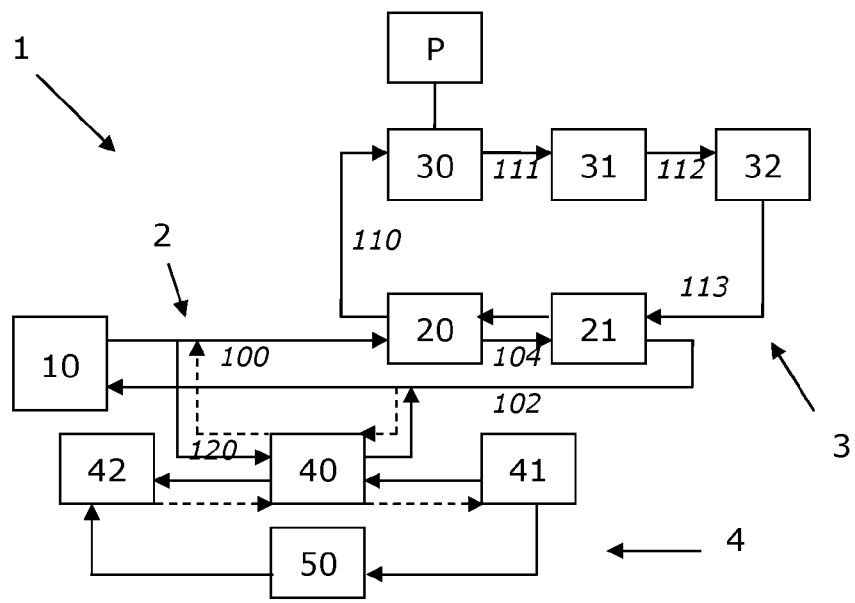
FIG. 2 shows a schematic diagram of a further prior art solar thermal power plant operating on conventional oil based technology comprising a molten salt storage system.

FIG. 2 is showing a further prior art solar thermal power plant 1 comprising a molten salt storage system. Part with similar reference numerals as shown and described in FIG. 1 are not described in detail. For explanation of said features, reference is made to the above description of a first known prior art solar thermal power plant.

The solar thermal power plant 1 comprises next to a heat transfer fluid circuit 2 and a boiler feed water circuit 3 also a heat storage medium circuit 4.

In the solar thermal power plant 1, in use, part of the hot oil stream (arrow 120) of the heat transfer fluid circuit 2 flows to the heat exchanger train 40, in order to preheat the cold molten salts mixture stored in the molten salts mixture storage tank 41. The hot molten salts mixture is accumulated during the day from the first storage tank 41 via the heat exchanger train into the second storage tank 42. The heat storage medium circuit 4 further comprises a heating unit 50. The unit 50 comprises a heater that is configured to heat the cold molten salt coming from the storage tank 41 in case it is not heated by the heat exchanger train 40, for instance at night or with bad weather conditions resulting in little solar radiation. Subsequently, the heated molten salt is pumped to the tank 42. During the night or during lack of sun, the hot molten salt flows back to the heat exchanger train (pumps no shown) to heat up oil in the heat transfer fluid circuit 2. The oil in turn will raise steam in the first heat exchanger 20 and the heat exchanger system 21 such that electricity P may be generated in the steam turbine 30 even during periods of minimal or complete lack of solar radiation.

Figure 3:
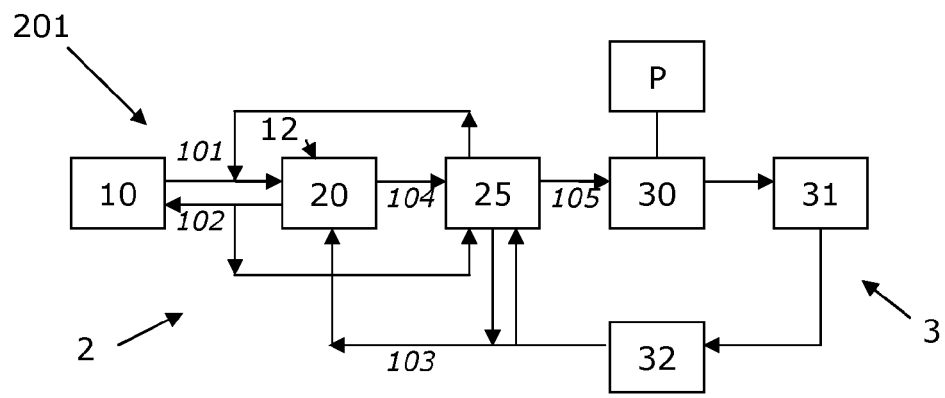
FIG. 3 shows a schematic diagram of a solar thermal power plant according to an embodiment of the invention.

In FIG. 3, a first embodiment of the solar thermal power plant 201 according to the invention is schematically shown. The reference numbers that are similar to reference numbers indicating features in the prior art solar thermal power plants 1 as shown in FIGS. 1 and 2, refer to similar features that operate in a similar way. The solar thermal power plant 201 according to the invention comprises a solar collection system 10 for heating the molten salts mixture in the heat transfer fluid circuit 2 to a temperature of approximately 550° C. by the concentrated solar radiation emitted onto the solar collection system 10. The molten salts mixture typically consists of a mixture of $KNO_3$ and $NaNO_3$. These salts can be used at operation temperatures up to 550° C. and these salts are non-toxic. Due to such a high operating temperature, using molten salts mixture as heat transfer fluid results in a more efficient steam cycle, for instance when compared to using oil as the heat transfer fluid.

In the heat transfer fluid circuit 2 a heated molten salts mixture storage tank 12 is provided to store the molten salts mixture that is heated by the solar radiation (arrow 101). Also a steam generation section 20 is provided operatively coupled to the storage tank 12, comprising a heat exchanger to transfer heat from the heated molten salts mixture to the boiler feed water in the boiler feed water circuit 3 to generate steam.

The solar thermal power plant 201 further comprises a back-up boiler system 25 that is configured to at least heat the molten salts mixture, in case the molten salts mixture can not be heated by solar radiation, to a temperature of 280-550° C. and to pre-heat the boiler feed water before it reaches the steam generation section. Since the molten salts mixture is only in a liquid state when it has a relatively high temperature, typically above 250° C., the boiler feed water has to be pre-heated to a temperature of approximately 200-250° C. (i.e. being a 250° C. steam) as well to prevent the molten salts to freeze when being in thermal contact with the boiler feed water in order to prevent obstructions in the heat exchanger 20.

The back-up boiler system 25 thus prevents freezing of the molten salts mixture during periods of absence of solar radiation. The back-up boiler 25 is also configured to superheat the flow of saturated or partially superheated steam that is supplied to the steam turbine 30 to a final temperature of 450-550° C. (arrows 104, 105) to generate electricity P.

Besides, the back-up boiler system is configured to provide further thermal services such as heating the de-mineralized water between 70-90° C. and generation of low pressure steam for continuous operation of an integrated desalination unit (not shown) to desalinate sea water for drinking purposes. A further detailed description of the back-up boiler system 25 is given with reference to FIGS. 4, 5 and 6.

The solar thermal power plant 201 according to the embodiment of the invention further comprises a condensing unit 31, in which unit the steam from the steam turbine 30 is condensed. Downstream of the condensing unit 31 a degasifier 32 is provided to receive the condensed steam and to supply boiler feed water to the heat exchanger of the steam generation section 20 and to the back-up boiler system 25.

The solar thermal power plant 201 according to the embodiment of the invention operates as follows:

The solar thermal power plant 201 may be used for two different modes of operation, one in which electricity is produced and one wherein no electricity is produced. Besides, the availability of solar radiation is of importance for the way of operation of the solar thermal power plant 201. During the day, in case solar radiation is present, the heated molten salts mixture coming from the solar collection system 10 is pumped into the molten salts mixture storage tank 12 (arrow 101) in which steam is generated at a pressure within the range of 5.0-11.0 MPa by means of the steam generation section 20. At the same time, cooled molten salts mixture present at the bottom area of the storage tank 12 is pumped back into the solar collection system 10 (arrow 102) by means of suitable pumps (not shown). In the steam generation section 20, the boiler feed water supplied from the degasifier 32 (arrow 103) is pre-heated to generate saturated steam (arrow 104).

Figure 4:
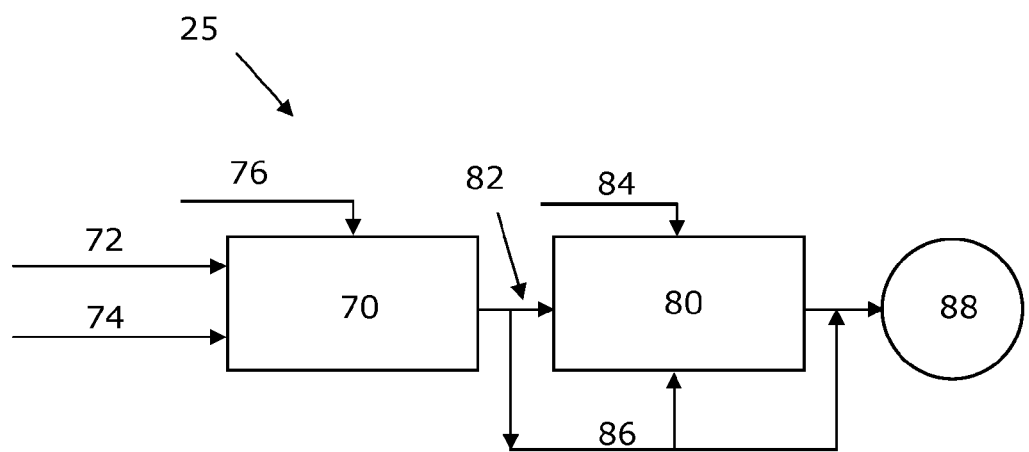
FIG. 4 shows a schematic diagram of the overall back-up boiler system geometry according to an embodiment of the invention.
Figure 5:
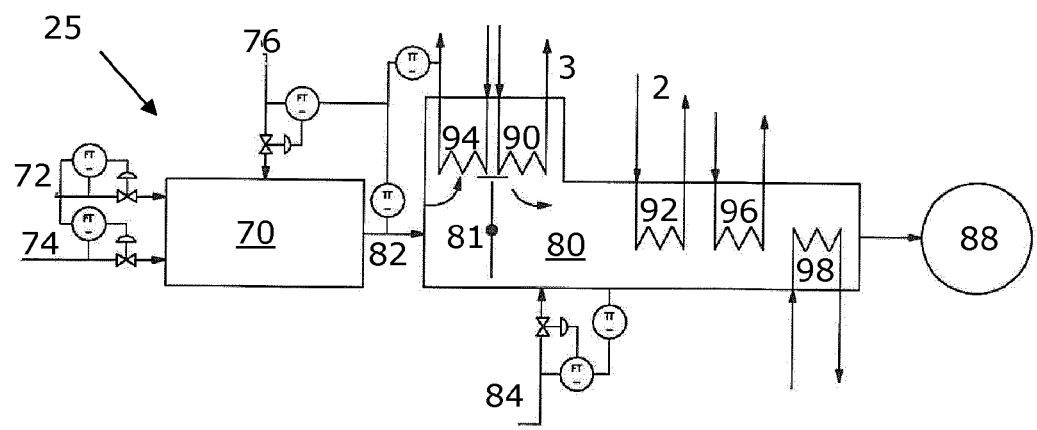
FIG. 5 shows a schematic diagram of a configuration of the convection section of the back-up boiler system according to an embodiment of the invention.
Figure 6:
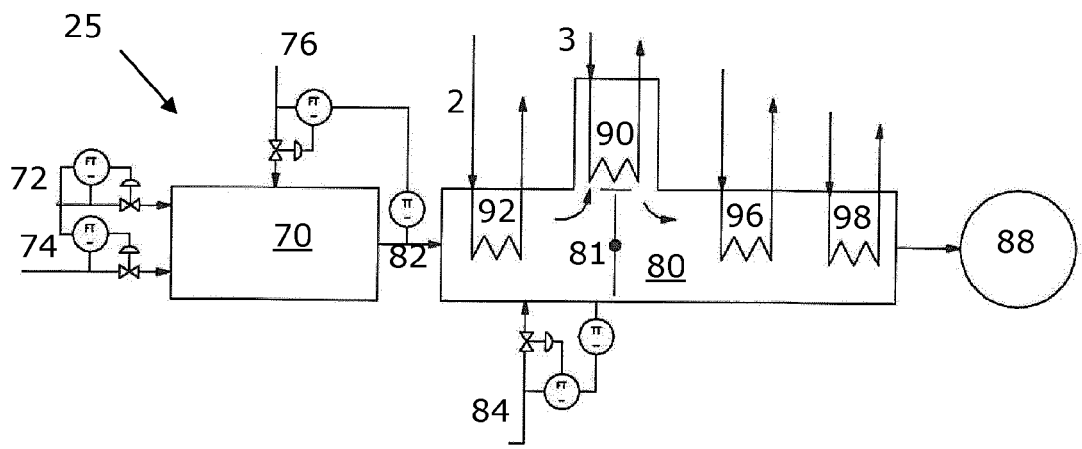
FIG. 6 shows a schematic diagram of a configuration of the convection section of the back-up system according to a further embodiment of the invention.

The back up-boiler system 25 is configured to operate at three different modes: in a start-up condition, in daytime conditions and in night or lack of sun conditions. Referring to FIGS. 4, 5 and 6 examples of an embodiment of the back-up boiler system 25 according to the invention will be described in detail. The back-up boiler system 25 comprises a combustion chamber 70 and a convection section 80 (see FIG. 4). Between the combustion chamber 70 and the convection section 80 a flue gas supply 82 is provided for supplying flue gas from the combustion chamber 70 into the convection section 80. In the shown embodiment of the back-up boiler system 25, the combustion chamber comprises a fuel inlet 72 for providing bio-fuel or auxiliary fuel to the combustion chamber 70 and a primary air inlet 74 necessary for combustion. Furthermore, a secondary air inlet 76 is provided for temperature control of the flue gas when leaving the combustion chamber 70. The convention chamber 80 comprises a quench air inlet 84. The back-up boiler system 25 further comprises a flue gas bypass 86 configured for bypassing at least part of the convection section 80. Downstream the convection section 80 and downstream of the flue gas bypass 86 a flue gas stack 88 is provided for exhausting the flue gasses to the outside air.

In a first embodiment of the back-up boiler system 25, the convection section 80 comprises (see FIG. 5) a heat exchanger 90 for pre-heating the boiler feed water. The heat exchanger 90 for pre-heating the boiler feed water is operatively coupled to and in fluid connection with the boiler feed water circuit 3. The convection section 80 also comprises the molten salts mixture heat exchanger 92 for heating the molten salts mixture during absence of solar radiation. Said heat exchanger 92 is operatively coupled to and in fluid connection with the heat transfer medium circuit 2. Furthermore, also a heat exchanger 94 for steam generation or superheating the steam may be provided. Said heat exchanger 94 is provided in fluid connection with the steam turbine 30. The convection section 80 further comprises a low pressure steam generation heat exchanger 96 and a demi water pre-heater heat exchanger 98.

The convection section 80 comprises valve means 81, to provide bypass possibilities to allow the flue gas to bypass the heat exchanger for-preheating the boiler feed water. In another embodiment of the invention, also a valve means may be provided to bypass the heat exchanger for generating low pressure steam.

Due to the above described configuration of the back-up boiler system 25, the back-up boiler system allows to:
  to pre-heat the boiler feed water during the start-up at a temperature higher than the molten salts solidification point;
  to heat up the molten salts up to a temperature of approximately 550° C. during night conditions, to maintain the power generation up to the desired level or any other operating required condition;
  to control the final temperature of superheated steam under any operating set or to provide steam re-heating of the steam between the various turbine steps, resulting in maximizing the overall energy efficiency of the solar thermal power plant 201.

The solar thermal power plant 201 comprises a control unit (not shown) for controlling the back-up boiler system 25 based on at least the molten salts mixture temperature in the different parts of the heat transfer fluid circuit 2, the boiler feed water temperature and/or the steam temperature in the boiler feed water circuit 3. Furthermore, the control unit may be configure to control the amount of air entering the combustion chamber via the primary and/or secondary air inlets 74, 76 and/or the amount of air entering the convection section 80 via the quench air inlet 84. The control unit may also be configured to control the valve means 81 to determine the direction of the flue gas inside the convection chamber 80 after the flue gas is supplied from the combustion chamber 70.

With such a configuration of the back-up boiler system 25 and in order to deal with the above described different operating conditions, the back-up boiler system 25 is able to produce flue gas at different temperatures and is able to exclude some of the thermal services by controlling the suitable valve means to bypass predetermined heat exchangers in the convection section 80. The desired variations in temperature of the flue gas may be obtained by controlling the primary and secondary combustion air in the combustion section of the boiler via the respective air inlets 74, 76, and by a proper use of quenching air streams via the quench air inlet 84. For instance, on a sunny day, the boiler feed water needs to be preheated, so the back-up boiler system will provide duty for this by controlling the secondary air inlet 76 such that the temperature of the flue gas will be able to transfer heat to the heat exchanger for the boiler feed water to heat the boiler feed water to approximately up to 250° C. Since the molten salts mixture is heated by means of the solar collection system 10, the back-up boiler system 25 does not need to heat the molten salts mixture. To obtain this, the valve means 81 is positioned such that the flue gas will pass through the heat exchanger 90 for heating the boiler feed water. Since further heating is not necessary, the quench air inlet 84 will supply cooled air to the convection chamber 80, downstream of the heat exchanger 90 for heating the boiler feed water, such that the flue gas will cool down such that no heat is exchanged by the further heat exchangers 92, 96, 98. Furthermore, there is no need for producing low pressure steam by the back-up boiler system since the low pressure steam for the desalination unit will be provided by exhaust steam coming from the steam turbine 30.

During night, for instance, there will be no demand for power generation. Therefore, there is no need for preheating the boiler feed water. In that case, the valve means 81 will rotate substantially 90 degrees such that no bypass of the heat exchanger 90 for the boiler feed water will be present. But it is necessary to keep the molten salts mixture heated as well as to generate low pressure steam to keep the desalination unit running. Therefore, the flue gas will be heated to have a suitable temperature for heating the molten salts mixture. After passing the heat exchanger 92 for heating the molten salts, the flue gas will pass the heat exchanger 96 for generation of low pressure steam for the desalination unit.

On a cloudy day, thus in case of lack of solar radiation, power generation will still be possible. In that case, the boiler back-up system 25 needs to preheat the boiler feed water. Due to the lack of solar radiation, it may also be necessary to heat the molten salts mixture. The low pressure generation needed for the desalination unit will be supplied by the steam turbine 30.

Furthermore, there is the possibility to run the back-up boiler system 25 in 'extended day mode'. This means that after sunset, when there is still demand for power generation, but at a lower level, the heat stored in the molten salt storage 12 is used to generate power. This requires heated boiler feed water and also some heating of the molten salts mixture, but both at a somewhat lower duty. The steam turbine 30 will provide the low pressure steam, but also at a lower level which leads to a lower production of desalinated water.

In FIG. 6 a further embodiment of the back-up boiler system 25 according to the invention is shown. This embodiment differs from the embodiment in FIG. 5 in that the heat exchanger 92 for heating the molten salts mixture is provided upstream of the heat exchanger 90 for pre-heating the boiler feed water instead of downstream thereof as shown in FIG. 5. Besides, no heat exchanger 94 for steam generation or superheating the steam is provided. For the operation of the back-up system 25 according to FIG. 6, reference is made to the description of the embodiment as shown in FIG. 5.

Figure 7:
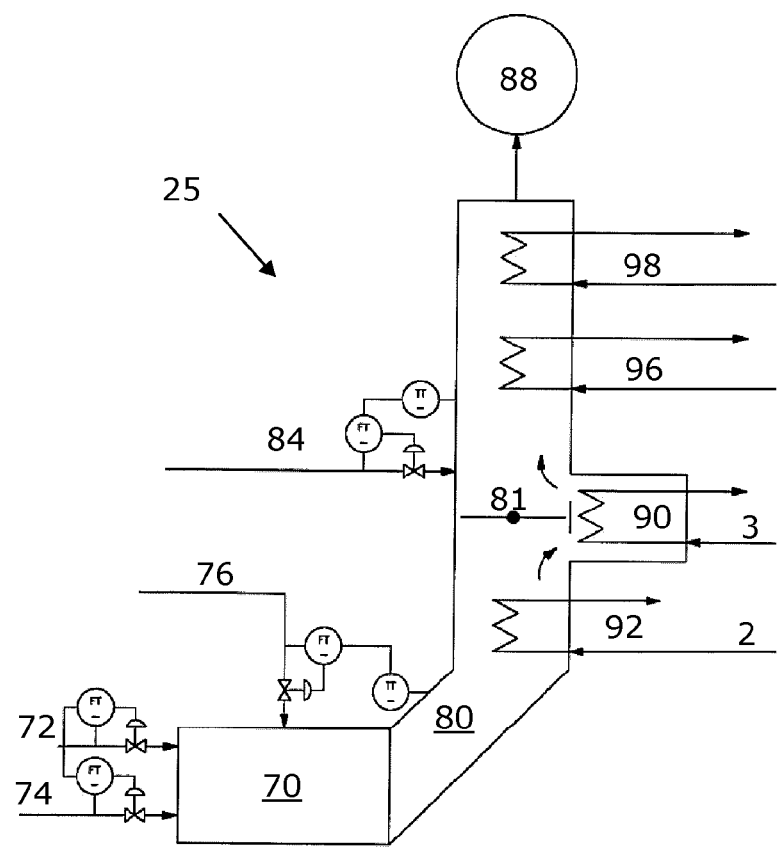
FIG. 7 shows a schematic diagram of a configuration of the convection section of the back-up system according to a third embodiment of the invention.

In FIG. 7 a third embodiment of the back-up boiler system 25 according to the invention is shown. This embodiment differs from the embodiment shown in FIG. 6 in that the convection section 80 is directly coupled to the combustion chamber 70. No flue gas supply 82 between the combustion chamber 70 and the convection section 80 is provided. Furthermore, the quench air inlet 84 is provided downstream of the valve means 81 to supply quench air to the inner space of the convection section downstream of the heat exchanger 90 for preheating boiler feed water. For explanation of the other features and operation of the back-up boiler system 25 as shown in FIG. 7, reference is made to the description relating to FIGS. 5 and 6.

Figure 8:
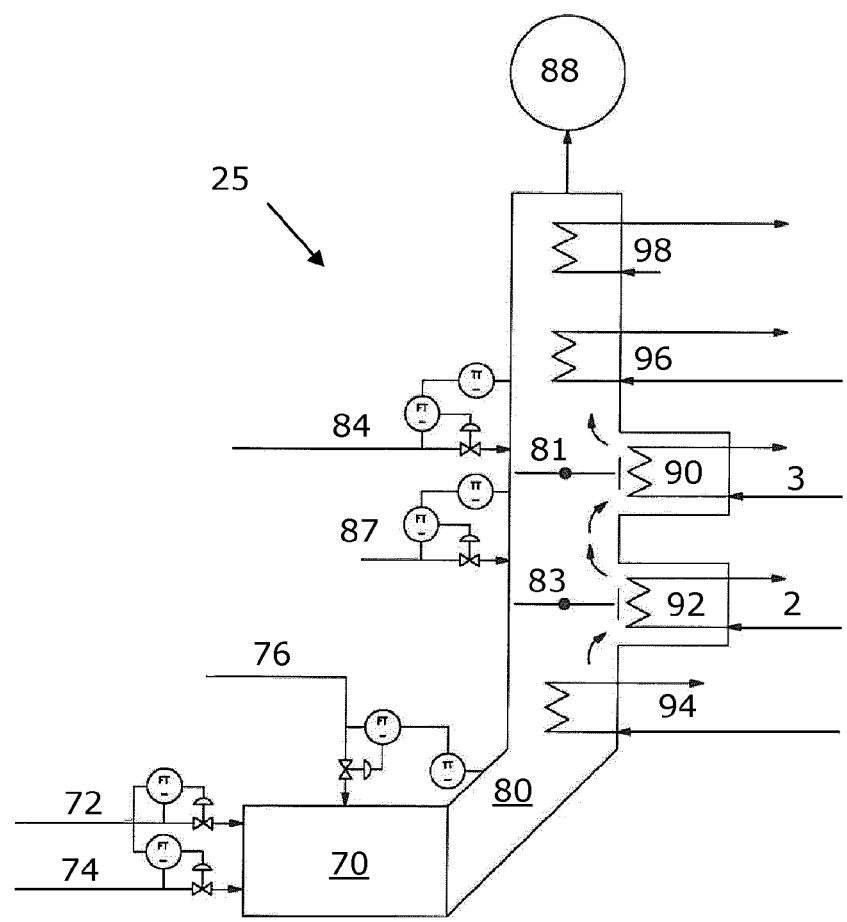
FIG. 8 shows a schematic diagram of a configuration of the convection section of the back-up system according to a fourth embodiment of the invention.

In the fourth embodiment of the back-up boiler system 25 as shown in FIG. 8, the differences with respect to the embodiment of FIG. 7 lie in the fact that a heat exchanger 94 for steam generation or superheating the steam is provided upstream of the heat exchanger 92 for preheating the molten salts mixture. Furthermore, a second valve means 83 is provided, to provide bypass possibilities to allow the flue gas to bypass the heat exchanger 92 for-preheating molten salts mixture. Also a second quench air inlet 87 is provided downstream of the second valve means 83 and upstream of the first valve means 81, to supply quench air to the convection section 80 inner space such that the air passing any heat exchanger, 90, 96, 98 downstream thereof has been quenched before passing any of said heat exchangers 90, 96, 98. After passing the heat exchanger 90 for preheating boiler feed water, the first quench air inlet 84 supplies quench air to the convection section 80 inner space such that the air contacting the heat exchanger 96 for low pressure steam generation or heat exchanger 98 for preheating demi-water will exchange heat from a somewhat cooled down flue gas. For explanation of the other features and operation of the back-up boiler system 25 as shown in FIG. 8, reference is made to the description relating to FIGS. 5, 6 and 7.

Although illustrative embodiments of the present invention have been described above, in part with reference to the accompanying drawings, it is to be understood that the invention is not limited to these embodiments. Variations to the disclosed embodiments can be understood and effected by those skilled in the art in practicing the claimed invention, from a study of the drawings, the disclosure, and the appended claims. It will be clear, for example, that the back-up boiler system can have a different configuration with a combustion chamber and convection section of different configurations comprising different heat exchangers for various thermal services.

Reference throughout this specification to "one embodiment" or "an embodiment" means that a particular feature, structure or characteristic described in connection with the embodiment is included in at least one embodiment in the present invention. Thus, the appearances of the phrases "in one embodiment" or "in an embodiment" in various places throughout this specification are not necessarily all referring to the same embodiment. Furthermore, it is noted that particular features, structures or characteristics of one or more embodiments may be combines in any suitable manner to form new, not explicitly described embodiments.

The invention claimed is:

1. A back-up boiler system (25) for a solar thermal power plant (201) for transferring solar energy into electricity, said back-up boiler system comprising:
a combustion chamber (70), and
a convection section (80) in fluid connection with said combustion chamber (70), wherein in the convection section (80) at least a first heat exchanger (92) is provided for heating a molten salts mixture of the solar thermal power plant and a second heat exchanger (90) is provided for pre-heating boiler feed water of the solar thermal power plant,
wherein the back-up boiler system (25) is configured to allow selection between only providing heat to the first heat exchanger (92), only providing heat to the second heat exchanger (90) and providing heat to both heat exchangers (90, 92), dependent on availability of solar radiation and/or dependent on demand of power generation;
wherein the first heat exchanger (92) is operatively coupled to a heat transfer fluid circuit (2) comprising the molten salts mixture and wherein the second heat exchanger (90) is operatively coupled to a boiler feed water circuit (3) comprising the boiler feed water; and
wherein the back-up boiler system further comprises at least two valves (81, 83) configured to selectively direct flue gas coming from the combustion chamber along at least one of the first heat exchanger, the second heat exchanger, and both of the first heat exchanger and the second heat exchanger.

2. The back-up boiler system according to claim 1, wherein the back-up boiler system comprises a controller that is configured to adjust the temperature of the flue gas.

3. The back-up boiler system according to claim 1, wherein the convection section (80) comprises the at least two valves configured to provide a bypass allowing the flue gas from the combustion chamber (70) to bypass the second heat exchanger (90) for pre-heating the boiler feed water.

4. The back-up boiler system according to claim 1, wherein the combustion chamber (70) comprises both a fuel inlet (72) and a primary air inlet (74) for combustion and a temperature control (76) to control the flue gas temperature at least when leaving the combustion chamber.

5. The back-up boiler system according to claim 4, wherein the temperature control comprises a secondary air inlet (76) for supplying air to the combustion chamber to decrease the flue gas temperature.

6. The back-up boiler system according to claim 4, wherein the convection section comprises at least a further temperature control (84) to control the flue gas temperature inside the convection section (80).

7. The back-up boiler system according to claim 6, wherein the further temperature control comprises at least one quench air inlet (84) to decrease the temperature inside the convection section (80), and
wherein the at least one quench air inlet (84) is placed downstream of the first heat exchanger (92) with respect to the combustion chamber (70).

8. The back-up boiler system according to claim 6, wherein the at least two valves and both temperature controls (76, 84) are configured to cooperate for heating the molten salts mixture to a temperature in a range of 280° C.-550° C. and are configured to cooperate for heating the boiler feed water up to 250° C., and
wherein the convection section (80) comprises the at least two valves configured to provide a bypass allowing the flue gas from the combustion chamber (70) to bypass the second heat exchanger (90) for pre-heating the boiler feed water.

9. The back-up boiler system according to claim 1, wherein the convection section further comprises at least one of a third heat exchanger (94) for steam generation or steam superheating to a temperature up to 530° C., a fourth heat exchanger for low pressure steam generation (96) and a fifth heat exchanger (98) for pre-heating demineralised water up to 90° C.

10. The back-up boiler system according to claim 9, wherein the back-up boiler system comprises a third valve configured to provide a steam bypass allowing the flue gas to bypass the fourth heat exchanger for generating low pressure steam.

11. The back-up boiler system according to claim 1, comprising a control unit for controlling the back-up boiler system based on at least one of the molten salts mixture temperature and the boiler feed water temperature.

12. The back-up boiler system according to claim 11, wherein the convection section comprises at least one quench air inlet (84) to control the flue gas temperature inside the convection section (80), the combustion chamber comprises a primary air inlet (74) for combustion and a secondary air inlet (76) for supplying air to the combustion chamber to decrease the flue gas temperature, wherein the control unit is operatively coupled to the at least two valves (81, 83) and to at least one of the primary air inlet (74), the secondary air inlet (76), and the at least one quench air inlet (84).

13. The back-up boiler system according to claim 1, wherein the at least two valves comprises a first bypass valve (83) for bypassing the first heat exchanger (92) and downstream thereof, with respect to the flue gas coming from the combustion chamber, a second bypass valve (81) for bypassing the second heat exchanger (90), and said first bypass valve and said second bypass valve (81, 83) permit each respective heat exchanger to switch between a configuration for letting the flue gas bypass said respective heat exchanger and letting the flue gas pass over said respective heat exchanger.

14. A solar thermal power plant for transferring solar energy into electricity comprising the back-up boiler system (25) according to claim 1, the plant further comprising:
the heat transfer fluid circuit (2) comprising a heat transfer fluid, said heat transfer fluid being the molten salts mixture, said heat transfer fluid circuit being in thermal contact with a solar collection system (10) for heating the molten salts mixture;
the boiler feed water circuit (3) comprising the boiler feed water, said boiler feed water circuit being in thermal contact with the heat transfer fluid circuit to produce steam in the boiler feed water circuit;
a steam turbine (30) operatively coupled to the boiler feed water circuit for generating the electricity by means of the supplied steam.

15. The solar thermal power plant according to claim 14, wherein the solar thermal power plant further comprises a storage tank (12) for storing the molten salts mixture and a steam generation unit (20) operatively coupled to the storage tank to transfer heat from the stored molten salts mixture to the boiler feed water to generate steam.

16. The solar thermal power plant according to claim 14, wherein the solar thermal power plant comprises an integrated thermal desalination unit,
wherein the integrated thermal desalination unit is connected to a fourth heat exchanger (96) provided in the convection section for receiving low pressure steam from said fourth heat exchanger.

17. A method for operating the solar thermal power plant according to claim 14, wherein the method comprises:
operating in a first mode wherein heat is provided only to the first heat exchanger (92) for heating the molten salts mixture to a temperature in a range of 280° C.-550° C., or
operating in a second mode wherein at least heat is provided only to the second heat exchanger (90) for pre-heating the boiler feed water up to 250° C., or
operating in a third mode wherein at least heat is provided to both heat exchangers (92, 90),
wherein selection of the operating mode is made dependent on availability of solar radiation and on demand of power generation; and
wherein said method includes switching between said first, second and third modes.

18. The method according to claim 17, wherein the method further comprises providing heat to a third heat exchanger (94) in fluid connection with the steam turbine (30), wherein the convection section (80) further contains said third heat exchanger (94) for generating steam or superheating steam to a temperature up to 530° C.

19. The method according to claim 17, wherein a heating temperature is controlled by supplying additional air during combustion of fuel in the combustion chamber and/or by supplying quench air to the convection section in which the heat exchangers are provided.

20. The method according to claim 17, wherein the method further comprises providing heat to a fourth heat exchanger (96) for generating low pressure steam for desalination and wherein the convection section (80) further contains said fourth heat exchanger (96) and wherein the solar thermal power plant comprises an integrated thermal desalination unit connected to said fourth heat exchanger (96).

21. The method according to claim 17, wherein the method further comprises providing heat to a fifth heat exchanger (98) for pre-heating demineralised water up to 90° C. and the convection section (80) further contains said fifth heat exchanger (98).

* * * * *